United States Patent [19]

Coltman et al.

[11] Patent Number: 4,998,128
[45] Date of Patent: Mar. 5, 1991

[54] PREFLASH MEASUREMENT TECHNIQUE

[75] Inventors: Judith N. Coltman; John P. Gaewsky, both of Reading; Jeffrey T. Gray, Boston, all of Mass.

[73] Assignee: Polaroid Corporation, Cambridge, Mass.

[21] Appl. No.: 414,267

[22] Filed: Sep. 29, 1989

[51] Int. Cl.⁵ .............................................. G03B 7/00
[52] U.S. Cl. .................................................. 354/415
[58] Field of Search ............................... 354/415, 403

[56] References Cited

U.S. PATENT DOCUMENTS

| | | | |
|---|---|---|---|
| 3,173,347 | 3/1965 | Stimson et al. | 354/415 |
| 3,415,644 | 12/1968 | Land | 430/220 |
| 3,753,302 | 8/1973 | Land | 354/248 |
| 3,942,183 | 3/1976 | Whiteside | 354/230 |
| 4,256,995 | 3/1981 | Ishida | 315/415 |
| 4,302,084 | 11/1981 | Greenwald et al. | 354/415 |
| 4,357,083 | 11/1982 | Johnson et al. | 354/415 |
| 4,549,801 | 10/1985 | Winter | 354/415 |
| 4,717,934 | 1/1988 | Kobayashi et al. | 354/415 |
| 4,785,322 | 11/1988 | Harrison et al. | 354/415 |
| 4,894,678 | 1/1990 | Farrington et al. | 354/415 |

Primary Examiner—Michael L. Gellner
Assistant Examiner—David M. Gray
Attorney, Agent, or Firm—John J. Kelleher

[57] ABSTRACT

An automatic exposure system for an electronic flash camera incorporates an arrangement for measuring the reflectivity of a scene illuminated by the electronic flash prior to exposure in order to determine certain photographic scene characteristics for use in controlling a subsequent photographic exposure, an arrangement that substantially reduces the complexity and energy consumption of the electronic flash system while improving the ability of the exposure control system to accurately determine these characteristics. The arrangement includes the pre-exposure firing of the electronic flash to illuminate a scene with a pulse of light for a short, fixed period of time. A reflection of this light pulse is integrated for a portion of this fixed period of time. The final integrated value of the reflected light is a measure of subject reflectivity. This integrated value is then employed to derive the desired photographic scene characteristics.

2 Claims, 3 Drawing Sheets ns. However,
this advantage produces a major disadvantage which is
the inability to accurately determine subject distances of
relatively close subjects. More importantly though, this
type of ranging system consumes a relatively large
amount of energy during the ranging process because
light from the electronic flash must continue to illuminate a scene, including a remote subject located therein,
until a predetermined level of reflected light has been
sensed and integrated, a level that is dependent, in large
part, upon subject distance. Generally, the more distant
a subject the greater will be the energy consumption
level.

The consumption of a large amount of energy for the
pre-exposure flash is not a problem in a ranging system
where two separate flash energizing or main discharge
capacitors are provided, such as is provided in the electronic flash device described in U.S. Pat. No. 4,256,995
to Ishida. However, in an exposure control system employing an electronic flash unit that includes a single
main discharge capacitor for storing all of the electrical
charge needed to fire the electronic flash both before
and during exposure, such as in the range-finding device

4,998,128

1

PREFLASH MEASUREMENT TECHNIQUE

BACKGROUND OF THE INVENTION

1. Field of the Invention

The present invention relates to an automatic exposure control system for an electronic flash camera, in general, and to a technique for employing the electronic flash in such a camera for determining certain photographic scene characteristics prior to exposure, in particular.

2. Description of the Prior Art

Automatic exposure control systems for electronic flash cameras that cause an electronic flash to illuminate a scene with artificial light prior to exposure, in order to determine certain photographic scene characteristics for the purpose of adjusting one or more camera functions, are known in the photographic arts. In, for example, U.S. Pat. No. 3,173,347 to Stimson et al., an automatic exposure control system for a camera is disclosed in which a source of artificial light is energized to illuminate a photographic scene prior to exposure and a signal derived from sensing a reflection of this illumination from a subject is employed to set a camera aperture.

In U.S. Pat. No. 4,302,084 to Greenwald et al, a focusing system for a photographic camera that also employs a pre-exposure flash is disclosed. This focusing system utilizes an electronic flash to direct light toward a subject to be photographed prior to exposure. The electronic flash light reflected from a subject within a scene is sensed and integrated. When the amount of reflected flash light reaches a predetermined level a quench circuit is activated to generate a signal which is used to extinguish the light emanating from the light source. A timer measures the elapsed time between the initiation of the electronic flash and the generation of the quench signal. Converter means are employed to translate the measured time interval into a range signal that is functionally related to the distance between the focusing system and the subject. This range signal may thus be employed to adjust or focus the movable element of an adjustable focus lens system.

A major advantage of the above-described ranging portion of the Greenwald et al. focusing system may be its ability to determine the distance to subjects over a relatively wide range of subject distadescribed in the above-noted Greenwald et al. patent, an excessive consumption of this stored charge before exposure may excessively limit the amount of charge available to fire the electronic flash for the required amount of time during exposure.

SUMMARY OF THE INVENTION

It is a primary object of the present invention, therefore, to provide an electronic flash system with a single main discharge capacitor that is capable of fully firing the electronic flash from a single capacitor charge both before and during an exposure interval.

It is another object of the present invention to provide an automatic exposure control system for an electronic flash camera incorporating a pre-exposure flash subject reflectivity measurement technique that is capable of accurately determining the distance to relatively close subjects.

It is a further object of the present invention to provide an automatic exposure control system for an electronic flash camera incorporating a pre-exposure flash subject reflectivity measurement technique of reduced cost and complexity.

Other objects, features and/or advantages of the present invention will be readily apparent from the following detailed description of a preferred embodiment thereof when taken in conjunction with the accompanying drawings.

In accordance with a preferred embodiment of the present invention an automatic exposure control system for an electronic flash camera is provided that incorporates reduced complexity and energy consumption means for measuring the reflectivity of a scene illuminated by the electronic flash prior to exposure in order to determine certain photographic scene characteristics for use in controlling a subsequent exposure. Means are provided for triggering the electronic flash to illuminate a scene with a pulse of light for an extremely short, fixed period of time and for integrating a reflection of this light from a scene subject. The final integrated value of the reflected light is a measure of subject reflectivity. Means are also provided for deriving certain photographic scene characteristics from this final value of integration for use in controlling a subsequent photographic exposure. Illuminating the scene with a pulse of light from an electronic flash for a fixed period of time with energy from a single main discharge capacitor in this manner makes more energy available to immediately fire the flash during a subsequent exposure with energy from the same main discharge capacitor.

DETAILED DESCRIPTION OF THE PREFERRED EMBODIMENT

Figure 1:
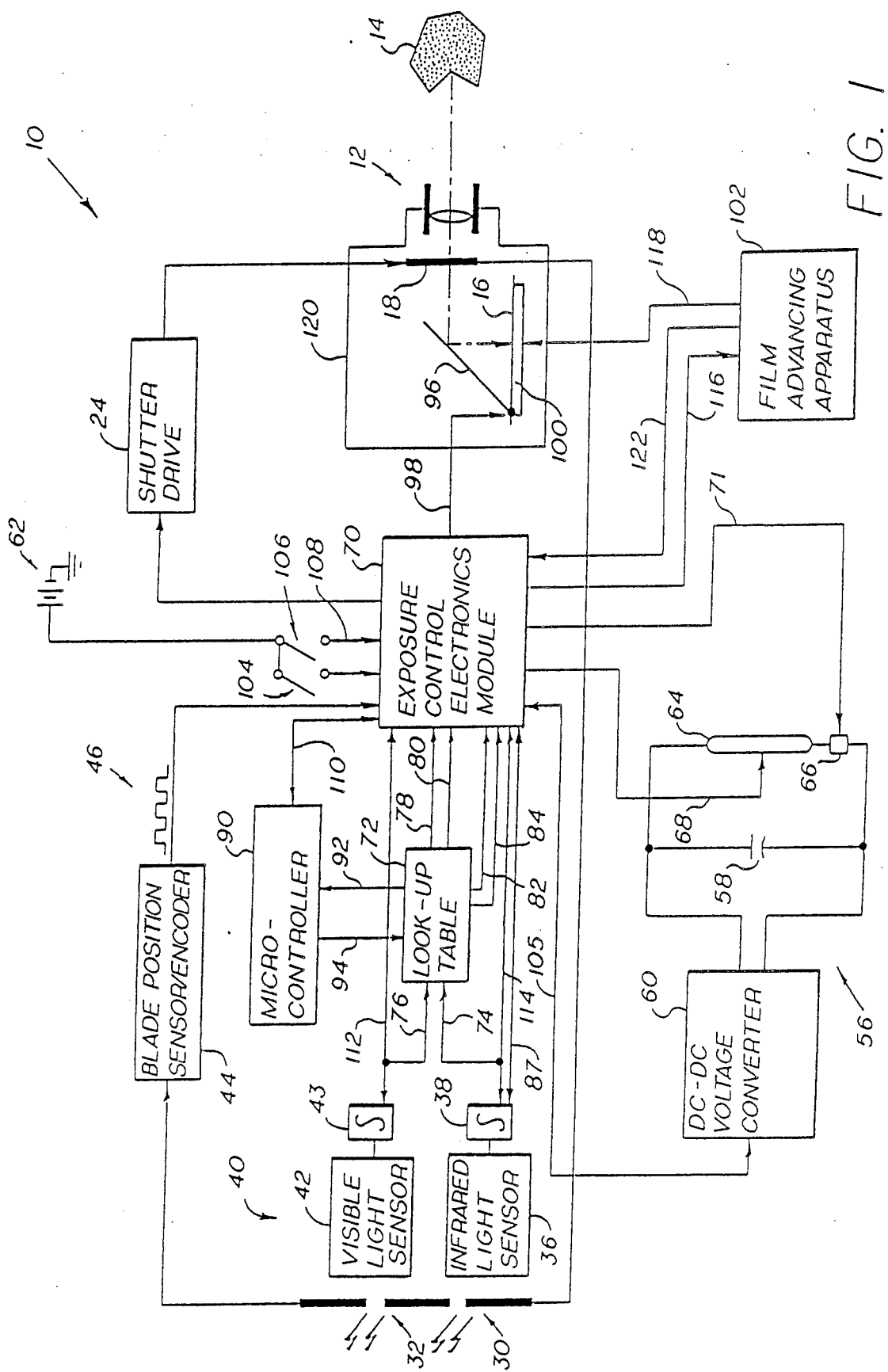
FIG. 1 is a schematic diagram of a photographic camera which incorporates a preferred embodiment of the pre-exposure, reflectivity measuring, exposure control system of the present invention.

Referring now to the drawings, and specifically to FIG. 1, there is shown a single lens reflex (SLR) photographic camera 10 of the self-developing type which incorporates a preferred embodiment of the pre-exposure, reflectivity measuring exposure control system of the present invention. The camera 10 includes an objective or taking lens 12, of the fixed focus type, that may include one or more elements (only one shown) for focusing image-carrying light rays of, for example, an object 14 on a film plane 16 through an aperture formed in a shutter blade mechanism or assembly 18.

Figure 2A:
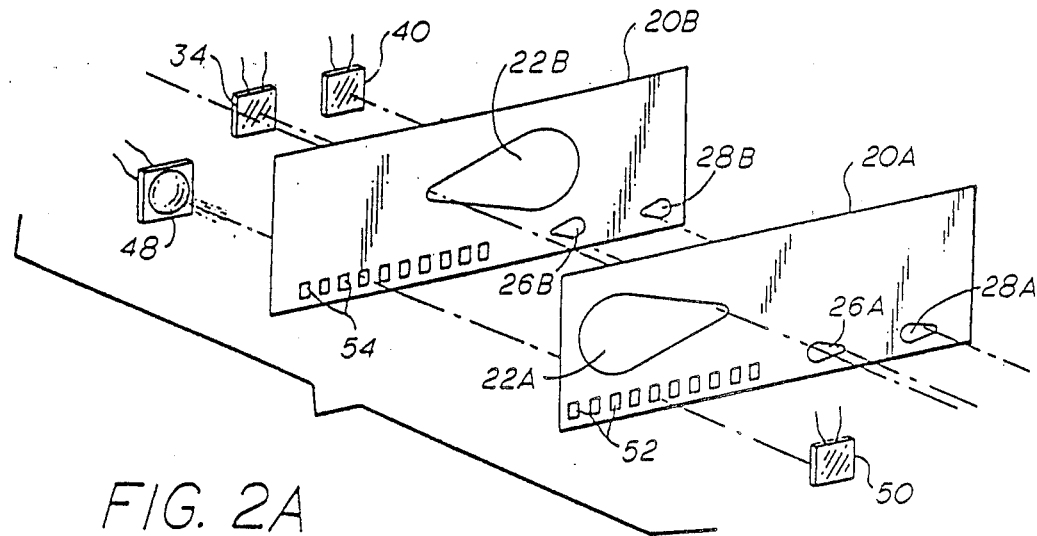
FIG. 2A is an exploded perspective view of a scanning type shutter blade mechanism which is also schematically shown in FIG. 1.
Figure 2B:
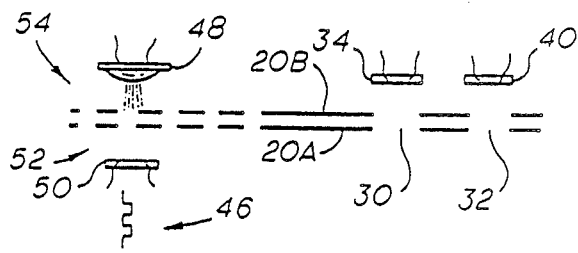
FIG. 2B is an unexploded top view, partly in section, of the shutter blade mechanism of FIG. 2A.

With additional reference to FIGS. 2A and 2B of the drawings, the blade mechanism 18, positioned intermediate the lens 12 and the film plane 16, includes a pair of overlapping shutter blade elements 20A and 20B of the "scanning " type. Scene light admitting primary apertures 22A and 22B, are respectively provided in the blade elements 20A and 20B to cooperatively define a progressive and predictable variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures are selectively shaped so as to overlay the central optical axis of the lens 12 thereby defining a gradually varying effective aperture size as a function of the position of the blades of the blade mechanism 18. A shutter drive 24 is provided for displacing the blade elements 20A and 20B. The shutter drive 24 includes a tractive electromagnetic device in the form of a solenoid (not shown) employed to diplace the shutter blade elements with respect to one another in a manner more fully described in the above-cited Whiteside patent.

Each of the blade elements 20A and 20B of the blade mechanism 18 includes two secondary apertures 26A, 28A and 26B, 28B, respectively. The aperture 26A in the blade 20A cooperates with the aperture 26B in the blade 20B to form an opening 30 and the aperture 28A in blade 20A cooperates with aperture 28B in blade 20B to form an opening 32 through the shutter assembly 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 34 within an infrared sensor and an integrator 38 that senses and integrates a corresponding amount of infrared scene energy through the opening 30. The amount of visible ambient light admitted to the film plane 16 through these primary apertures is controlled by a signal generated by a combination of a visible light photosensitive element 40 within a visible light sensor 42 and an integrator 43 that senses and integrates a corresponding amount of visible ambient light, through the opening 32. An example of scanning blade elements having primary and secondary apertures that cooperate to control the amount of scene light admitted to a film plane is shown in U.S. Pat. No. 3,942,183, supra.

The camera 10 is provided with a blade position sensor/encoder 44. The sensor/encoder 44 senses the position of the blade elements 20A and 20B with respect to one another and generates a signal 46 representative of the relative blade element position. The sensor/encoder 44 comprises a light emitting diode 48, a photosensor 50 spaced therefrom, and a plurality of slots or openings 52 and 54 formed in the blade elements 20A and 20B, respectively. The slots 52, 54 are rectangular in shape, are of uniform size and are equally spaced in a linear direction in their respective blade elements 20A and 20B. The slots 52, 54 are interposed between the light emitting diode 48 and the photosensor 50 such that they alternately block and unblock the transmission of light between these two components to thereby cause the photosensor 50 to generate one or more pulses 46 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulse or pulses 46 is also a measure of the size of the effective or taking aperture formed by the primary apertures 22A and 22B. The size of the slots 52, 54 in respective blade members 20A and 20B is kept to minimum, in the direction of blade member movement, in order to minimize any blade position errors between the actual size of an effective aperture formed by the primary apertures 22A and 22B and the relative blade position pulse signals 46 representative of this particular aperture.

The camera 10 is also provided with an electronic flash apparatus 56 together with apparatus for controlling its energization in order to determined subject reflectivity and to provide a portion of the exposure value required to illuminate a scene to be photographed. The electronic flash apparatus 56 comprises a main storage capacitor 58 which may be charged up to an operating voltage by any conventional voltage converter circuit (not shown) which would be included within a DC-DC voltage converter 60. The DC-DC voltage converter 60 operates in a conventional manner to convert a DC voltage as may be derived from a battery 62 of the camera 10, which can be in the order of 6 volts, to a suitable operating voltage such as 280 volts. A flash tube 64 and a series connected thyristor are collectively connected, in a parallel relation, with respect to the main storage capacitor 58. The flash tube 64 may be energized by a suitable trigger signal on a path 68 from a conventional trigger circuit (not shown) within an exposure control electronic module 70, and the thyristor 66 may be activated to its open state by a suitable trigger signal on a path 71 from another conventional trigger circuit (not shown) that is also included within the exposure control electronics module 70. When energized, the flash tube 64 illuminates the scene and subjects included therein with both visible and infrared light.

The camera 10 additionally includes an empirically derived look-up table 72. The primary purpose of the look-up table 72 is to control the amount of image-carrying scene light rays focused on the film plane 16 by the lens 12 through the effective or taking aperture in the blade mechanism 18 formed by the primary apertures 22A and 22B, as a function of ambient scene light and of subject reflectivity.

As previously explained, the amount of artificial and ambient scene light transmitted to the film plane 16 is indirectly measured by sensing a portion of the artificial and ambient scene light through the openings 30 and 32 in the blade mechanism 18 with the photosensor 34 located within the infrared light sensor 36 and its associated integrator 38 and the photosensor 40 located within the visible light sensor 42 and its associated integrator 43. A signal generated by the infrared sensor 36 and its associated integrator 38 representative of reflected infrared scene light is routed to the look-up table 72 through a path 74 and a signal generated by the visible light sensor 42 and its associated integrator 43 representative of ambient scene light is routed to the look-up table 72 through a path 76.

The look-up table 72 generates a plurality of different signals in response to these two signals for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 72 are (1) an aperture size signal that controls the size of the taking aperture formed by the primary apertures 22A and 22B at which the flash tube 64 is fired, on an output path 78; (2) a percentage of artificial light signal that controls the amount of artificial light to be added to the scene to be photographed by the flash tube 64, on an output path 80; (3) a percentage of ambient light signal that controls the amount of image-carrying light to be admitted to the film plane 16 through the primary apertures 22A and 22B in the blade mechanism 18, on an output path 82; and (4) a signal to terminate the exposure interval at a time dependent upon the magnitude of the artificial and ambient light signals appearing on the input paths 74 and 76, respectively, to the look-up table 72, if the exposure interval is not sooner terminated, on an output path 84.

As mentioned above, the camera 10 is provided with an electronic flash apparatus 56 whose light output is employed to determine subject reflectivity and to provide a portion of the exposure value required to illuminate a scene to be photographed. The light output of the electronic flash apparatus 56 is employed during an exposure cycle prior to an exposure interval for the determination of subject reflectivity.

Figure 3A:
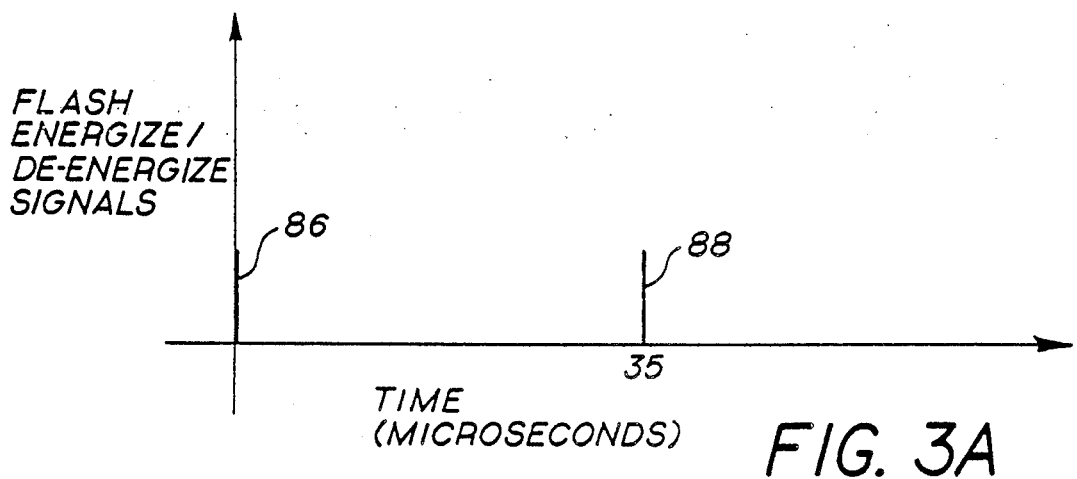
FIG. 3A is a graph of the electronic flash energizing and de-energizing signals, as a function of time, during an exposure cycle and prior to an exposure interval.
Figure 3B:
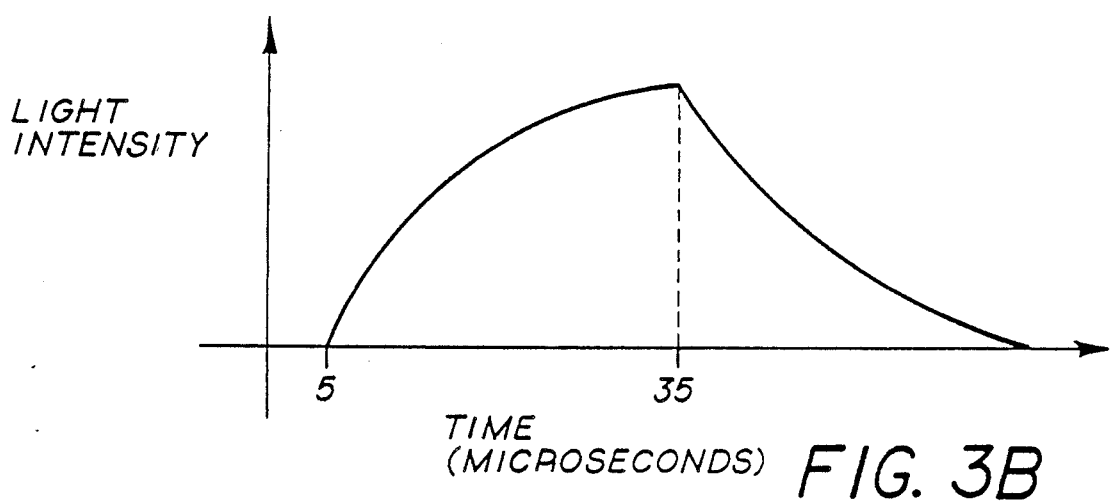
FIG. 3B is a graph of the light output of the electronic flash of the present invention, as a function of time, during an exposure cycle and prior to an exposure interval.
Figure 3C:
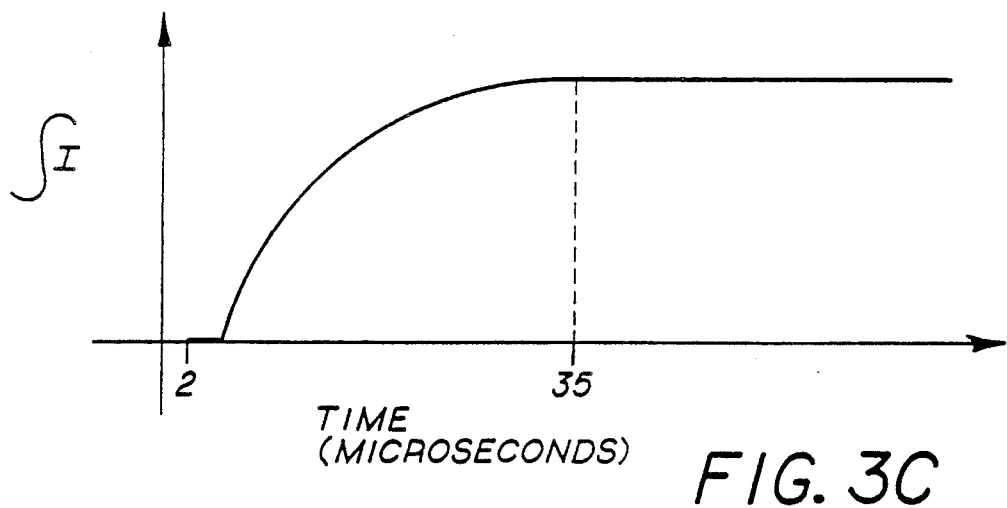
FIG. 3C is a graph of the time integration of the output current of the infrared sensor employed in the exposure control system of the present invention during an exposure cycle, prior to an exposure interval.

The reflectivity of a subject within a scene is determined in the following manner. With additional reference to FIGS. 3A, 3B and 3C of the drawings, when an exposure cycle is initiated the conventional trigger circuit (not shown) within the exposure control electronics module 70 transmits a trigger signal 86 (FIG. 3A) on the path 68 to energize or initiate the firing of the flash tube 64. After an inherent delay of approximately five microseconds, the flash tube 64 starts to illuminate the scene with visible and infrared light in the manner shown in FIG. 3B. After a delay of approximately two microseconds from the triggering of the flash tube 64, the integrator 38 at the output of the infrared light sensor 36 is enabled by an enable signal from the exposure control electronics module 70 on a path 87. This two microsecond delay is to minimize the possibility of integrating error-producing noise generated by the triggering of the flash tube 64 and by the sensing of ambient infrared light that might already be illuminating the scene prior to its being illuminated with light from the flash tube 64. FIG. 3C is a graph of the integration of the output current from the infrared sensor 36 as a function of time by the integrator 38.

Thirty-five microseconds after the triggering of the flash tube 64 to illuminate the scene by the exposure control electronics module 70, another conventional trigger circuit (not shown) within the exposure control electronics module 70 transmits a trigger signal 88 (FIG. 3A) on the path 71 to trigger the thyristor 66 to its open state and thereby initiate the extinguishing of the light output of the flash tube 64. At the same time that the thyristor 66 is triggered to initiate the extinguishing of the light output of the flash tube 64, the exposure control electronics module 70 disables the integrator 38 through the path 87 to terminate its integration of the output current of the infrared light sensor 36. It should be noted and as shown in FIG. 3B, even though the flash tube 64 is de-energized or triggered off at a particular time, it continues to illuminate the scene with light for a significant period thereafter.

In some applications, the initiating of the extinguishing of the light output from the flash tube 64 at the same time that the integrator 38 is disabled may introduce thyristor-generated-noise integration errors into the exposure control system of a magnitude that may not be tolerable. If this should occur, the integrator 38 could be disabled a few tenths of a microsecond before the triggering of the thyristor 66 and thereby avoid such errors. In other exposure control applications the disabling of the integrator 38 at the same time or before the initiating of the extinguishing of the light output from the flash tube 64 may result in an integration signal of insufficient magnitude for proper exposure control system operation. In such instances the integrator 38 may be disabled after the triggering of the thyristor 66 to its off or open state in order to increase the amount of light integrated thereby. However, additional circuitry may have to be added to compensate for the integration errors that would normally be produced when the integrator 38 integrates all of the noise generated by the actuation of the thyristor 66 to its off or open state, if such integration errors are unacceptable. No matter what point in time the integrator 38 is disabled, its final level of integration would constitute a signal representative of subject reflectivity.

Prior to the generation of the above-noted look-up table 72 output signals on the paths 78, 80, 82 and 84, the ambient visible light signal generated by the visible light sensor 42, integrated by the integrator 43 and applied to the look-up table 72 through the path 76, is routed to a microcontroller 90 through a path 92, for temporary storage. Subsequent to the storage of this ambient visible light signal in the microcontroller 90 and prior to the start of an exposure interval, an infrared light signal generated by the infrared sensor 36 and the integrator 38 in response to a pre-exposure interval flash of light from the flash tube 64 containing an infrared light component that is reflected from a scene subject, is routed to the look-up table 72 through the path 74. The ambient visible light signal already stored within the microcontroller 90 is then routed to the look-up table 72 through a path 94. This stored ambient visible light signal and the infrared signal subsequently generated by the infrared light sensor 36 and integrated by the integrator 38 are collectively employed within the look-up table 72 to generate the above-noted signals appearing on the output paths 78, 80, 82 and 84 from the look-up table 72.

The signals appearing at the output paths 78, 80, 82 and 84 of the look-up table 72 in response to the infrared and ambient visible scene light signals respectively generated by the sensors 36 and 42 and their respective integrators 38 and 43, are empirically determined. The look-up table 72 is constructed in accordance with the subjective analysis of a multiplicity of photographic images of subjects located at various subject distances and having a range of reflectivities that are produced under a wide range of artificial and ambient scene light conditions, in order to generate these look-up table output signals.

In general, when forming a photographic image at the film plane 16 of the camera 10, the smaller the taking aperture formed by the primary apertures 22A and 22B, the greater will be the depth of field of the fixed focus lens 12 and the darker will be the image resulting from ambient scene light because of the reduction in the amount of image-carrying scene light caused by the smaller taking aperture. The look-up table 72 is constructed such that it performs a tradeoff between the sharpness of a subject within the scene and an overall photographic scene exposure. In performing this tradeoff, the look-up table 72 causes the flash tube 64 to fire at the smallest possible aperture, and therefore the greatest depth of field, that will provide the optimum subject sharpness and overall scene exposure. The look-up table 72 further improves the overall scene exposure in response to the infrared and visible light level signal generated by the sensors 36 and 42 by controlling the amount of artificial light generated by the flash tube 64 during an exposure interval and by controlling the maximum size of the taking aperture formed by the primary apertures 22A and 22B.

As noted above, the camera 10 is of the SLR type and therefore includes a conventional reflex mirror 96 that is actuatable by the exposure control electronics module 70 through the path 98. The mirror 96 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a lighttight film cassette 100 shown in the condition assumed just after the cassette 100 has been fully inserted into the camera 10. The cassette 100 may enclose the 6 VDC battery 62.

Mounted within the camera 10 is a film advancing apparatus 102 similar to that described in U.S. Pat. No. 3,753,392 to Land that includes a motor for operating a gear train (neither shown) which is coupled with the film advancing apparatus 102 to provide for the continuous movement of an exposed film unit from an exposure position within the camera 10 toward the exterior thereof. The film advancing apparatus 102 additionally includes a film-engaging arm member (not shown) driven by the above-mentioned motor and gear train. The arm member is adapted to extend into a slot in the cassette 100 and engage the uppermost film unit located therein at or near its trailing edge prior to moving it out of the cassette 100 and into the bite of a pair of conventional processing rollers (not shown) mounted adjacent the leading edge of the above-mentioned uppermost film unit. The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well-known in the art.

OPERATION

Figure 4:
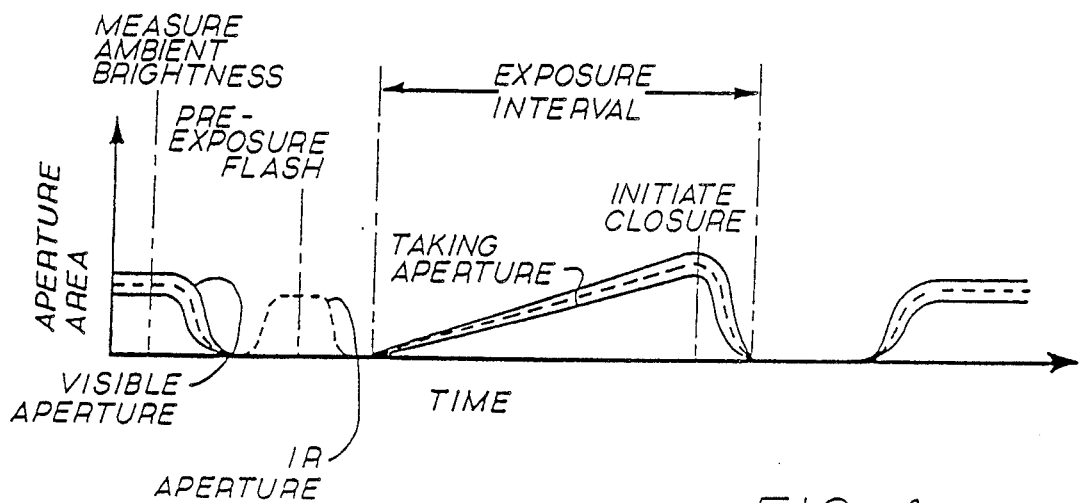
FIG. 4 is a graph showing primary and secondary blade aperture size variations as a function of time during an exposure cycle.

A typical exposure cycle will now be described in detail. For the purpose of this description it is assumed that the taking aperture of the blade mechanism 18 is in its full open position, that the openings 30 and 32 formed by the secondary apertures in the blade mechanism 18 are also fully opened, that the mirror 96 is in its viewing or light blocking position, that the flash apparatus 56 has been energized by the prior closure of a switch 104 that coupled the battery 62 to the DC-DC voltage converter 60 through the exposure control electronics module 70 and a path 105 and that the main storage capacitor 58 is fully charged and is ready for the initiation of an exposure cycle. FIG. 4 is a graph showing primary and secondary blade aperture size variations as a function of time during the typical exposure cycle. With reference to FIGS. 1, 2A, 2B, 3A, 3B, 3C and 4 of the drawings, a switch 106 is actuated to its closed position by a camera operator to initiate an exposure cycle. The closure of the switch 106 couples the battery 62 to the exposure control electronics module 70 through a path 108. With the blade mechanism opening 32 formed by the secondary apertures 28A and 28B adjacent the visible light sensor 42 in its full open position, the exposure control electronics module 70 and the microcontroller 90 coupled thereto through a path 110, in turn, activate the visible light sensor 42 and the integrator 43 coupled to the visible light sensor 42, through a path 112. When activated, the integrator 43 is enabled to integrate ambient scene light for a fixed period of time and then send the final integrated value thereof to the look-up table 72 through the path 76 and then to the microcontroller 90 through the path 92 for temporary storage.

Subsequent to the storage of the ambient scene light information in the microcontroller 90, the exposure control electronics module 70 energizes the shutter drive 24 to actuate the blade mechanism 18 and therefore the taking aperture together with the opening 30 formed by the secondary apertures 26A and 26B, and the opening 32 formed by the secondary apertures 28A and 28B, to their fully closed positions. Subsequent to the closing of the opening 30 in the shutter mechanism 18 and prior to the initiations of an exposure interval, the shutter drive 24 causes the opening 30 to increase in size toward its fully opened position. While the opening 30 is being moved toward its fully opened position, the exposure control electronics module 70 actuates means (not shown) for moving the mirror 96 from its viewing or light blocking position, where it precludes the transmission of image carrying light rays to the film plane 16, to its light unblocking position (as shown in FIG. 1), where it facilitates the transmission of image-carrying light rays to the film plane 16 during an exposure interval through the path 98. When the opening 30 adjacent the infrared light sensor 36 is in its fully opened position, the exposure control electronics module 70 triggers the flash tube 64 through the path 68 to thereby illuminate a scene to be photographed with visible and infrared light prior to the initiation of an exposure interval. The exposure control electronics module 70 then triggers the thyristor 66 to its open or off state through the path 71 thirty-five microseconds after turning on the flash tube 64 to thereby initiate the extinguishing of the light output of the flash tube 64. This triggering on and off of the flash tube 64 constitutes a first pulse of light directed toward the scene to be photographed.

The exposure control electronics module 70 also activates the infrared light sensor 36 and the integrator 38 coupled thereto through the path 89 for thirty-three microseconds or for two microseconds less than the period of time that the strobe 64 is triggered to its on or scene illuminating state. The exposure control electronics module 70 then causes the final value of the integrator 38, which constitutes a measure of subject reflectivity, to be sent to the look-up table 72 through the path 74. Upon receipt of this subject reflectivity signal the look-up table 72 combines it with the ambient visible light signal previously stored in memory in the microcontroller 90. These combined signals are then employed to generate the aperture size flash fire signal, the percentage of artificial light signal, the percentage of ambient light signal and the end of exposure signal subsequently appearing on the look-up table output paths 78, 80, 82 and 84, respectively, that are, in turn, applied to the exposure control electronics module 70. Upon receipt of these look-up table generated signals, the exposure control electronics module 70 actuates the shutter drive 24 and the blade mechanism 18 coupled thereto such that the opening 30 formed by the secondary apertures 26A and 26B is placed in its fully closed position and actuates the shutter drive 24 and the blade mechanism 18 to initiate an exposure interval. The exposure control electronics module 70 includes four conventional comparators (not shown) to determine when the four conditions represented by the look-up table output signals on the paths 78, 80, 82 and 84 and employed in the generation of an exposure interval have been achieved. An exposure interval is defined herein as the period of time that the shutter mechanism 18 allows image-carrying light rays collected by the lens 12 to reach the film plane 16.

The first of the above-mentioned comparators compares the reference or desired aperture size flash fire signal on look-up table output path 78 with the blade position signal and therefore the taking aperture size as represented by the pulses 46 from the blade position sensor/encoder 44. When this first comparator determines that these two signals are equal, the exposure control electronics module 70 once again triggers the flash tube 64 through the path 68 and thereby illuminates the scene being photographed with visible and infrared light during the exposure interval.

The second of the above-mentioned comparators compares the reference or desired percentage of artificial light signal on look-up table output path 80 with the actual level of artificial light illuminating the scene as sensed by the infrared sensor 36, integrated by its associated integrator 38 and then routed to the exposure control electronics module 70 through the path 114. When this second comparator determines that these two signals are equal, the exposure control electronics module 70 triggers the thyristor 66 to its open state through the path 71 to thereby cause the artificial light being generated by the flash tube 64 to be extinguished. This illumination of the scene with artificial light constitutes a second pulse of light that is directed toward the scene to be photographed.

The third of the above-mentioned comparators compares the reference or desired percentage of visible light signal on look-up table output path 82 with the actual level of visible light illuminating the scene as sensed by the visible light sensor 42, integrated by its associated integrator 43 and then routed to the exposure control electronics module 70 through the path 112. When this third comparator determines that these two signals are equal, the exposure control electronics module 70 activates the shutter drive 24 to close the taking aperture in the blade mechanism 18 and thereby terminate the exposure interval.

Under certain scene lighting and subject reflectivity conditions there may be insufficient ambient and/or artificial scene light reflected from the scene for the infrared sensor 36 and/or the visible light sensor 42 to generate a signal that is capable of causing the exposure control electronics module 70 to terminate an exposure interval within a reasonable amount of time. A fourth comparator arrangement compares a signal on the lookup table output path 84 representative of the actual level of ambient or reflected scene light with a predetermined reference signal stored within the exposure control electronics module 70. If the signal on the path 84 is equal to or greater than the reference signal, the exposure interval will be limited to a relatively short period of time such as 40 milliseconds whereas if this signal is less than the reference signal the exposure interval will be limited to a relatively long period of time such as 400 milliseconds unless terminated sooner by the presence of sufficient exposure levels of ambient and/or artificial scene light.

At the completion of the exposure interval, the exposure control electronics module 70 actuates the mirror 96 toward its light-blocking position, and actuates the film advancing apparatus 102 and the drive motor (not shown) included therein, through a path 116, to initiate the transport and processing of an exposed, self-developing film unit. The film advancing apparatus, in turn, moves the exposed film unit located in the cassette 100, through a path 118, into the bite of the pair of adjacent processing rollers (not shown), in the manner described above, to spread processing liquid between certain film layes and to move the exposed film unit into an exit slot (not shown) in a housing 120 of the self-developing camera 10. After the mirror 96 has been actuated to its light blocking position where it precludes the passage of light to the film plane 16, the exposure control electronics module 70 actuates the shutter drive 24 and the shutter mechanism 18 coupled thereto such that the primary or taking aperture thereof is placed in its fully opened position. After the film advancing apparatus 102 as moved the exposed film unit through the above-mentioned pair of rollers, a film movement completion signal is routed to the exposure control electronics module 70 and the microcontroller 90 coupled thereto through a path 122. Upon receipt of this film movement completion signal the exposure control electronic module 70 initiates the charging of the electronic flash apparatus 56 through the path 105. When the main storage or discharge capacitor 58 of the electronic flash apparatus 56 is fully charged, as sensed through the path 105, the exposure control electronic module 70 places the exposure control system of the camera 10 in condition for the initiation of the next exposure cycle.

In the exposure control system described above, a source of artificial light generated by the flash tube 64 was employed to illuminate the scene with both infrared and visible light. The flash tube 64 illuminated the scene twice during an exposure cycle, once before and once during the exposure interval. All of the energy required by the flash tube 64 to illuminate the scene both before and during an exposure interval is provided by a single storage capacitor described herein as the main discharge capacitor 58. The amount of time that energy is available to the flash tube 64 from the main discharge capacitor 58 prior to an exposure interval is limited to a predetermined period of time. In this the preferred embodiment, that period of time has been limited to 35 microseconds. Limiting the amount of time and therefore the amount of energy available to the flash tube 64 prior to an exposure interval reduces the range of distances over which it can be employed in the determination of subject reflectivity. However, by limiting the amount of time that energy is available to the flash tube 64 for reflectivity determination purposes prior to an exposure interval, the main discharge capacitor 58 is able to store sufficient energy, from a single capacitor charge, to power the flash tube 64 both before and during an exposure interval.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed is:

1. Apparatus for measuring the reflectivity of a subject within a photographic scene, comprising:
    a light source for illuminating the photographic scene that is energizable for a fixed period of time;
    light sensitive means for detecting light emitted by said light source and reflected from the subject and for generating a signal responsive to the reflected light;
    integrating means coupled to said light sensitive means for integrating said reflected light responsive signal for a predetermined fixed period of time that commences two microseconds after energizing said light source to illuminate the scene and terminates at the end of the said fixed period of time that said light source is energized to illuminate the scene, whose final value of integration at the end of said fixed period of time is a signal that is a measure of subject reflectivity; and
    means for energizing said light source to illuminate the scene and thereby generate said subject reflectivity signal.

2. A method of measuring the reflectivity of a subject within a photographic scene comprising the steps of:
    energizing a light source so as to illuminate a subject within the photographic scene, for a fixed period of time;
    ditecting light emitted by the light source and reflected from the subject, and generating a signal responsive to the reflected light; and
    integrating the reflected light responsive signal for a period of time, commencing two microseconds after the activation of the light source to illuminate the scene and terminating at the end of the fixed period of time that the light source is energized to illuminate the scene, whose final value of integration at the end of the fixed period of time is a measure of subject reflectivity.

* * * * *